United States Patent
Heitzmann et al.

(10) Patent No.: US 12,354,474 B2
(45) Date of Patent: Jul. 8, 2025

(54) CAMERA BASED SPEED LIMIT ASSIST

(71) Applicant: Valeo Schalter und Sensoren GmbH, Bietigheim-Bissingen (DE)

(72) Inventors: Thomas Heitzmann, San Mateo, CA (US); Alexandre Garnault, Bietigheim-Bissingen (DE); Skander Hannachi, Bietigheim-Bissingen (DE)

(73) Assignee: Valeo Schalter Und Sensoren GmbH, Bietigheim-Bissingen (DE)

( * ) Notice: Subject to any disclaimer, the term of this patent is extended or adjusted under 35 U.S.C. 154(b) by 179 days.

(21) Appl. No.: 18/312,220

(22) Filed: May 4, 2023

(65) Prior Publication Data

US 2024/0371265 A1    Nov. 7, 2024

(51) Int. Cl.
  *G08G 1/0962*  (2006.01)
  *B60W 30/14*   (2006.01)
  *G06V 20/58*   (2022.01)

(52) U.S. Cl.
  CPC ......... *G08G 1/0962* (2013.01); *B60W 30/146* (2013.01); *G06V 20/58* (2022.01); *B60W 2555/60* (2020.02)

(58) Field of Classification Search
  CPC ... G08G 1/0962; G06V 20/58; B60W 30/146; B60W 2555/60
  See application file for complete search history.

(56) References Cited

U.S. PATENT DOCUMENTS

2015/0151756 A1* 6/2015 Han ................ B60W 30/18145
                                                701/93
2017/0308759 A1* 10/2017 Mullen ................ G06V 20/56
(Continued)

FOREIGN PATENT DOCUMENTS

EP    3372466 A1     9/2018
EP    4015333 A1     6/2022
WO  2022/251697 A1  12/2022

OTHER PUBLICATIONS

International Search Report issued in corresponding International Application No. PCT/US2024/027162 mailed Sep. 20, 2024 (4 pages).

(Continued)

*Primary Examiner* — Mahmoud S Ismail
*Assistant Examiner* — Gabriel Anfinrud
(74) *Attorney, Agent, or Firm* — Osha Bergman Watanabe & Burton LLP

(57) ABSTRACT

A method for operating a driver assistance system for a vehicle includes capturing a video feed of an external environment of the vehicle and transmitting the video feed to an Electronic Control Unit (ECU) of the vehicle. Subsequently, a designated speed limit for the vehicle at a current location of the vehicle is determined. The method further includes extracting context information of the external environment from the video feed and comparing the context information to the designated speed limit to create a contextual speed limit. A user is notified of the vehicle of the contextual speed limit. The context information designates a specific environment that the vehicle is located in based upon one or more of: first warning information that informs the user of unsafe driving conditions, first guidance information that provides directional information to the user, and objects located in the specific environment of the vehicle.

16 Claims, 7 Drawing Sheets

(56) References Cited

U.S. PATENT DOCUMENTS

| | | | |
|---|---|---|---|
| 2021/0197720 A1* | 7/2021 | Houston | G06N 3/045 |
| 2021/0197813 A1* | 7/2021 | Houston | B60W 30/143 |
| 2021/0387524 A1* | 12/2021 | Kim | B60K 35/22 |
| 2022/0176957 A1* | 6/2022 | Tamilarasan | G05D 1/0231 |
| 2022/0379913 A1 | 12/2022 | Rodriguez Hervas et al. | |
| 2023/0075493 A1 | 3/2023 | Kabkab | |
| 2023/0227082 A1* | 7/2023 | Vrba | G06V 20/56 |
| | | | 701/19 |

OTHER PUBLICATIONS

Written Opinion issued in corresponding International Application No. PCT/US2024/027162 mailed Sep. 20, 2024 (7 pages).

* cited by examiner

CAMERA BASED SPEED LIMIT ASSIST

BACKGROUND

Recent advances in the field of driver assistance systems enable vehicles to detect and classify moving and stationary objects while driving, through the use of an object detection system. Advances in object detection as a whole have also enabled extracting information from the classified objects. By combining these technologies, modern vehicles are capable of detecting a speed limit sign located in a local environment of the vehicle and extracting the speed limit of the environment that the vehicle must obey.

As a result of these capabilities, it is becoming increasingly common for governmental entities to implement laws and restrictions controlling the behavior of the vehicle in relation to the object detection protocols. Such laws and restrictions may include restrictions on the success rate of the object detection itself, such as a minimum confidence that the system must have for a particular object classification, or a minimum number of successfully identified objects. Due to the fact that vehicles must share a road, highway, or other driving surface with other drivers, and the fact that the vehicles are regulated by government entities, it is imperative that a vehicle is able to correctly display a safe speed limit for the surrounding environment. Additionally, it is also imperative to ensure that the vehicle is capable of validating any received or designated speed limit in case the vehicle receives false or misleading information related to the speed limit.

SUMMARY

A method for operating a driver assistance system for a vehicle includes capturing a video feed of an external environment of the vehicle and transmitting the video feed to an Electronic Control Unit (ECU) of the vehicle. Subsequently, a designated speed limit for the vehicle at a current location of the vehicle is determined. The method further includes extracting context information of the external environment from the video feed and comparing the context information to the designated speed limit to create a contextual speed limit. A user is notified of the vehicle of the contextual speed limit. The context information designates a specific environment that the vehicle is located in based upon one or more of: first warning information that informs the user of unsafe driving conditions, first guidance information that provides directional information to the user, and objects located in the specific environment of the vehicle.

A driver assistance system for a vehicle includes a first sensor, a dashboard, and an Electronic Control Unit (ECU) of the vehicle. The first sensor captures a video feed of an external environment of the vehicle. The dashboard notifies a user of the vehicle of one or more vehicle operating conditions. The ECU receives the video feed from the first sensor, determines a designated speed limit for the vehicle at a current location of the vehicle, and extracts context information of the external environment from the video feed. Subsequently, the ECU compares the context information to the designated speed limit to create a contextual speed limit. The contextual speed limit is output to the dashboard to notify the user of the contextual speed limit. The context information designates a specific environment that the vehicle is located in based upon one or more of: first warning information that informs the user of unsafe driving conditions and first guidance information that provides directional information to the user.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed towards embodiments of driver assistance systems and methods of operating driver assistance systems. The driver assistance system is capable of receiving a video feed and data of the local environment of a vehicle including the driver assistance system, and determining a context associated with the local environment.

A context associated with the specific (or local) environment is defined to include, but is not limited to, a classification of the environment into a predefined category. For example, an urban environment that the vehicle traverses may be classified as being a "city" context, while a rural environment may be classified as a "country side." Other examples of environment contexts include a "parking lot", a "highway", a "school zone", a "construction zone", a "highway exit zone", a "road work" area, or other equivalent descriptions of the environment. Based upon the context identified and associated with the vehicle and a designated speed limit of its current location that is detected or received by the driver assistance system (i.e., a speed limit extracted from a speed limit sign), the driver assistance system determines a contextual speed limit of the region. The contextual speed limit is notified to a user of the system, which allows the user to control the vehicle with knowledge of the contextual speed limit rather than just the designated speed limit. In other words, in one or more embodiments, the speed limit is gleaned using only a camera, and without map information.

Figure 1:
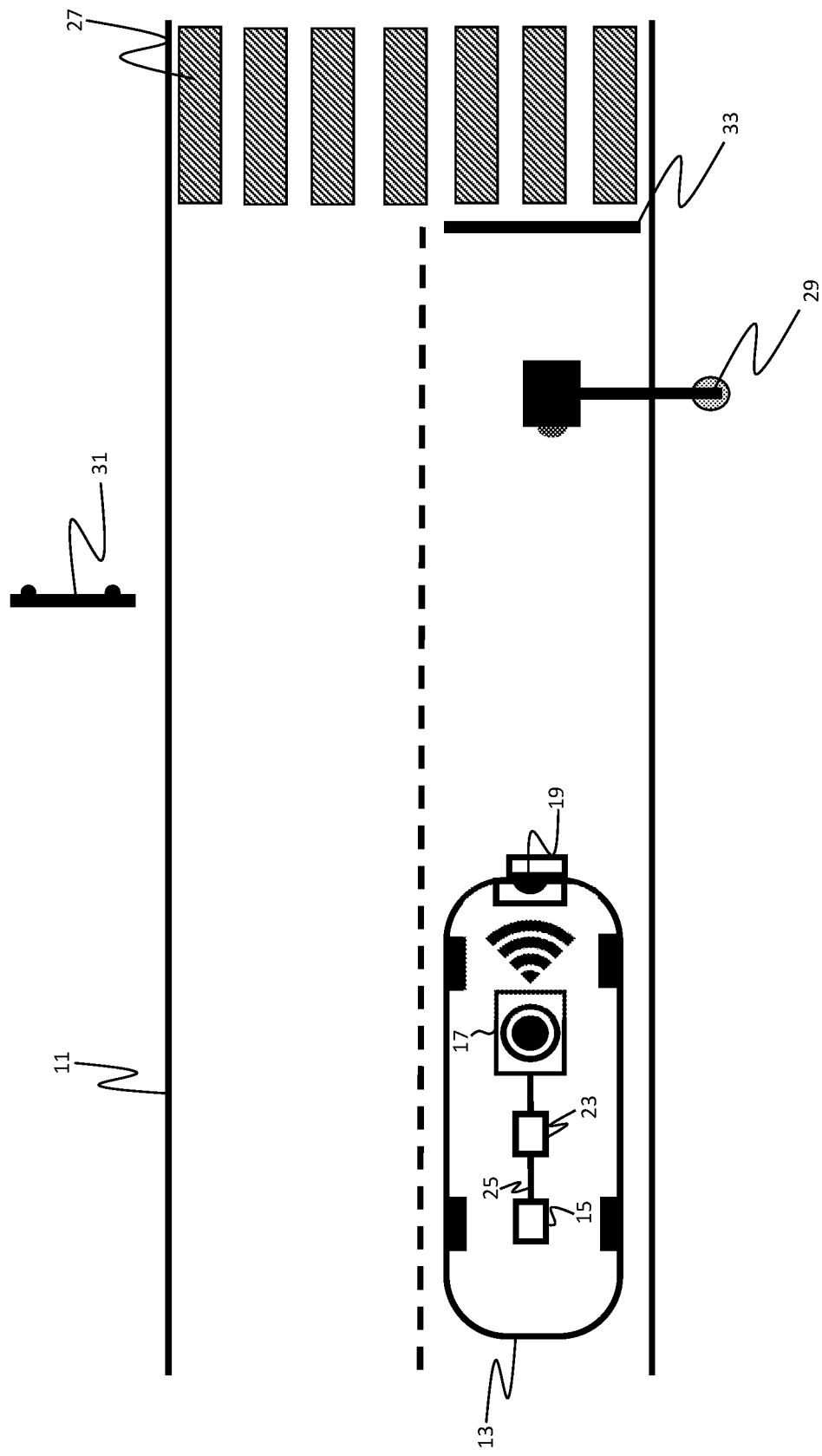
FIG. 1 shows a system in accordance with one or more embodiments disclosed herein.

FIG. 1 depicts an example of a vehicle 13 in accordance with one or more embodiments disclosed herein. As shown in FIG. 1, a vehicle 13 traveling on a roadway 11 includes an Electronic Control Unit (ECU) 15, a first sensor 17, a second sensor 19, and a dashboard 23. Components of the vehicle 13 are interconnected through the use of a bus 25, which is at least one wire, wiring harness, and/or connector that serve to transmit data throughout the vehicle 13. Collectively, the ECU 15, the first sensor 17, the second sensor 19, and the bus 25 are part of an Advanced Driver Assistance System, which is further discussed in relation to FIG. 5.

The first sensor 17 and the second sensor 19 collect quantitative data associated with the environment of the vehicle 13. Examples of the first sensor 17 and the second sensor 19 include a two dimensional camera, a three dimensional or stereoscopic camera, a radar unit, a LiDAR unit, an ultrasonic frequency transducer, or equivalent sensors and components that perceive the environment of the vehicle 13. Furthermore, the first sensor 17 and/or the second sensor 19 may include multiple sensors in a single package, and may be the same type of sensor or a different type of sensor.

The ECU 15 may be formed of one or more processors, microprocessors, or equivalent computing structures, and serves to generate and transmit instructions and context information to a driver of the vehicle 13 and to the other components of the vehicle 13 such as the dashboard 23. The instructions and context information are generated based on data received from the first sensor 17 and the second sensor 19, such as the video feed. The context information may include, for example, one or more of regulatory information including a designated speed limit of the current location of the vehicle 13, warning information informing a driver of hazards or unsafe conditions in front of the vehicle 13 (such as a curved or graded road, falling objects, or equivalent hazard information), or other information useful to a driver. The designated speed limit, on the other hand, is extracted from the video feed by the ECU 15, the first sensor 17, or the second sensor 19. Context information and data derived from the context information may be presented to a user via the dashboard 23, which is a display such as a Liquid Crystal Display (LCD), an Organic Light-Emitting Diode (OLED) display, a quantum dot display, or equivalent display that is configured to present the driver with information received from the ECU 15.

Context information generated by the ECU 15 is based upon the surroundings of the vehicle 13. As shown in FIG. 1, the vehicle 13 is located on a roadway 11 that is located in an urban environment. Thus, the local environment of the vehicle 13 includes a cross walk 27, a traffic light 29, a cross walk sign 31, a stop line 33, and a roadway 11. where the roadway 11 includes two lanes for automotives travelling in opposite directions. While the vehicle 13 is traveling on the roadway 11, the first sensor 17 and the second sensor 19 capture raw data, such as a video feed, that includes each of the cross walk 27, the traffic light 29, the cross walk sign 31, the stop line 33, and any other objects of the environment. This raw data is subsequently used by the ECU 15, the first sensor 17, or the second sensor 19 to determine the context of the vehicle 13.

After capturing the data on the specific environment of the vehicle 13, the data is processed to extract context information therefrom. Examples of processing the data include inputting the data into one or more object detection algorithms such as a Single Shot Detection (SSD), Region-based Convolutional Neural Network (R-CNN), You Only Look Once (YOLO) Single Shot Detection, Fast R-CNN, Histogram of Oriented Gradients (HOG), or equivalent algorithms. The object detection process may be performed by the ECU 15, a dedicated component such as a graphics card, or by the first sensor 17 and/or the second sensor 19 themselves. As an output of the algorithm, the ECU 15 receives the identity of the object, the location of the object, and any text associated with the object. For example, in the case of the vehicle 13 processing data of the roadway 11 including the cross walk sign 31, the vehicle 13 receives context information that a warning sign that represents the presence of a cross walk 27 is located a specific distance from the vehicle 13. The vehicle 13 receives similar data for each of the other objects, which completes the object detection process. Nonlimiting examples of objects include obstacles, hazards, lane markings, people, wildlife, and other physical items (including items disclosed herein and depicted in FIGS. 1 and 2) located in the specific environment of the vehicle.

Each piece of data received by the vehicle 13 that corresponds to the specific environment is analyzed by the vehicle 13 to determine a context of the specific environment. An example of the analysis process is given in FIG. 3, and is briefly presented below. To analyze the data, the ECU 15 determines a weight (e.g., FIG. 3) that represents the distance from the object to the ECU 15. The weights (e.g., FIG. 3) have values from 0-1 (inclusive), where a value of 0 means that the object is relatively far from the ECU 15, while a value of 1 means that the object is disposed relatively close to the vehicle 13, such as being in the visual vicinity of the vehicle 13. When the vehicle 13 initially determines the identity of an object, such as a speed limit sign, the object is assigned a weight of 1, and this value decays as the vehicle 13 drives away from the object. Once established, each weight is multiplied by a confidence value to create a weighted confidence value (e.g., FIG. 3), which is used by the ECU 15 to determine the context region associated with the specific environment.

The confidence values also have values ranging from 0-1 (inclusive), where a value of 0 means that the object is of little importance to the ECU 15 in determining whether the environment is related to a particular context, and a value of 1 indicates that the object is heavily correlated with a particular context. Thus, the confidence value reflects a confidence level of the ECU 15 that the context information extracted from the video feed corresponds to a particular specific environment of the vehicle 13. Confidence values may be assigned/generated by the ECU 15 as part of a machine learning process, assigned by an operator or manufacturer of the system, or alternatively downloaded from an external database (not shown) such as a server. It is noted that because the ECU 15 is trying to analyze whether the object belongs to one context out of a plurality of contexts, the ECU 15 will multiply the single weight associated with the object with a confidence value generated for each context (e.g., FIG. 3).

For example, in the environment shown in FIG. 1, the ECU 15 will identify an object (for exemplary purposes, the cross walk sign 31) and assign a weight (e.g., FIG. 3) based on the distance of the object from the vehicle 13. Continuing with the example, the ECU 15 determines the object to be the cross walk sign 31 with a weight of 0.9, implying the cross walk sign 31 is relatively close to the vehicle 13, but may not be in the visual vicinity thereof. Subsequently, the ECU 15 forms a confidence matrix and determines a confidence value (e.g., FIG. 3) based on the context information (i.e., the cross walk sign) for each potential context of the specific environment based on the identity of the object.

In the case of FIG. 1, the ECU 15 determines whether the object belongs to one of four context regions including: a city context, a parking lot context, a country side context, and a highway context. Because a cross walk sign 31 is often seen in a city, sometimes seen in the country side or parking lot, and never seen on the highway, for example, the ECU 15 respectively assigns confidence values of 0.9 (city), 0.5 (country side, parking lot), and 0 (highway). The confidence values are then multiplied by the weights to form a matrix of weighted confidence values (e.g., FIG. 3). This results in a weighted confidence value for the identified cross walk sign 31 with values of [0.81, 0.45, 0.45, 0], where the value of 0.81 corresponds to the weight of 0.9 multiplied by a city confidence value of 0.9, the value of 0.45 corresponds to the weight of 0.9 multiplied by a country side confidence value of 0.5, and so on.

Thus, overall, the ECU 15 forms a matrix of weighted confidence values 69 that represent the overall correspondence between a context sign and a particular context region. This process is repeated for each object (e.g., the cross walk 27, the traffic light 29, the cross walk sign 31, and the stop line 33) located in the environment of the vehicle 13, which forms a matrix (e.g., FIG. 3) in the ECU 15 that describes the correlation of multiple objects to a context of the environment. The ECU 15 then adds the weighted confidence values 69 for each context, and determines the context of the environment to be the context with the highest sum of weighted confidence values 69 (e.g., FIG. 3).

The ECU 15 also receives overarching maximum and minimum speed limits that are associated with each context. The overarching maximum and minimum speed limits may be legal speed limits determined by a government entity, or speed limits determined by a user or manufacturer of the system. For example, an ECU 15 receives data that indicates that the maximum speed limit for the "country side" context is 50 Miles Per Hour (MPH) (80 Kilometers Per Hour (KPH)), while the minimum speed limit is 25 MPH (50 KPH). Once the ECU 15 has identified the overall context of the environment, the ECU 15 assigns the overarching speed limits to the identified environment as maximum and minimum allowable speed limits. Each context of the region may be associated with different overarching speed limits, or one or more contexts may have some or all of the same limits as the other contexts, or overlap therewith.

As noted above, the ECU 15 also receives data indicating the presence of regulatory information such as speed limit signs, stop signs, a traffic light, a yield sign, or equivalent signs or information, as well as the information contained in the regulatory sign (i.e., the speed limit). Thus, in addition to the overarching speed limits assigned to the environment as described above, the ECU 15 is also aware of the speed limits notified by speed limit signs, which are referred to as "designated speed limits" herein. The ECU 15 compares the overarching speed limits to the designated speed limit to generate a contextual speed limit (e.g., FIG. 3), which is the speed limit displayed to the driver on a dashboard 23.

Figure 3:
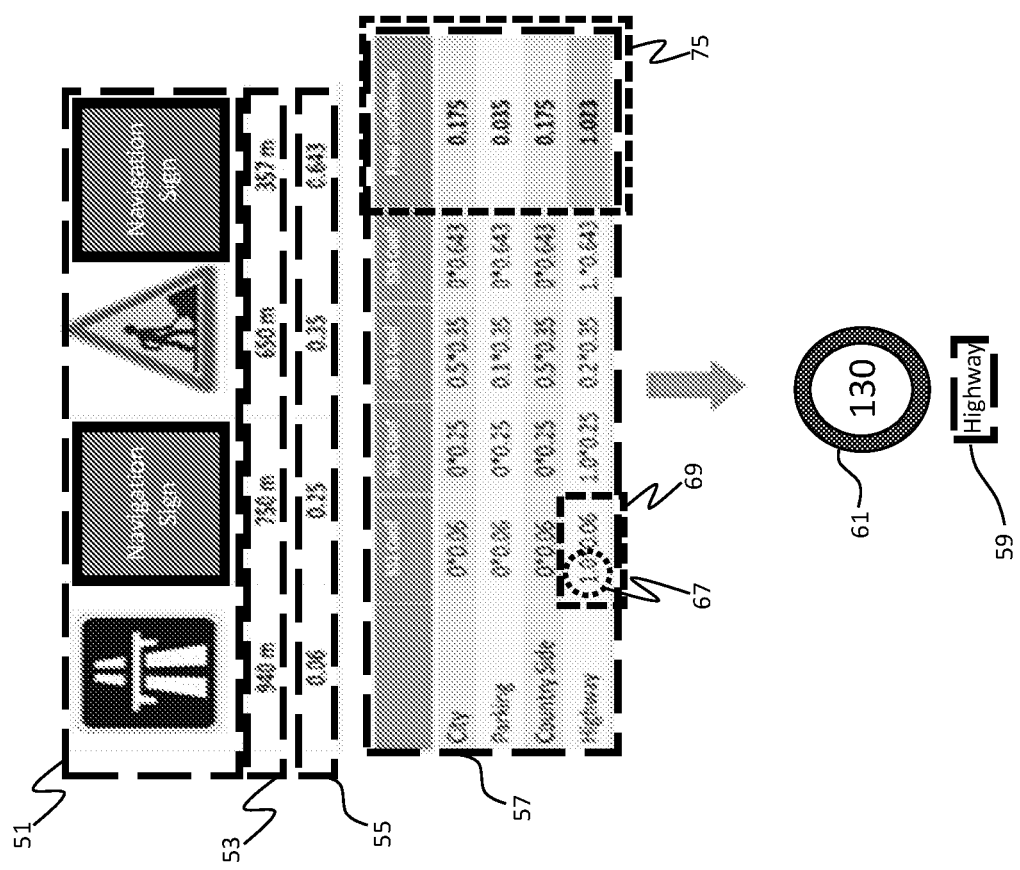
FIG. 3 shows a visualization of a process in accordance with one or more embodiments disclosed herein.

Specifically, in a case where the designated speed limit falls within the overarching speed limits, the ECU 15 displays the designated speed limit as the contextual speed limit (e.g., FIG. 3). However, if the designated speed limit exceeds the overarching speed limits, the maximum overarching speed limit is displayed to an operator of the vehicle 13. Alternatively, if the ECU 15 has a relatively high confidence in the overarching maximum speed limit and a relatively low confidence in the detected speed limit, then the ECU 15 displays the maximum overarching speed limit to the operator. On the other hand, if the designated speed limit is below the minimum overarching speed limit, the minimum overarching speed limit is output to the operator. Furthermore, if the video feed is unavailable, the ECU 15 enters a degraded mode, and displays an error message or icon indicating that the ECU 15 is unsure of the contextual speed limit (e.g., FIG. 3). The ECU 15 may also alternatively enter the degraded mode if the designated speed limit is above or below the overarching speed limits to indicate to the driver that there is a mismatch between the designated speed limit and the overarching speed limits.

In addition to displaying the contextual speed limit (e.g., FIG. 3) on the dashboard 23. the ECU 15 is configured to generate audible sounds and haptic feedback for the driver of the vehicle 13. Specifically, once the ECU 15 determines the contextual speed limit (e.g., FIG. 3), the ECU 15 informs the driver of the vehicle, via a sound system (not shown) of the vehicle 13, and the identified context region as well as the contextual speed limit (e.g., FIG. 3) derived from the context region. Similarly, the ECU 15 also delivers a signal to the steering wheel (not shown) that instructs the steering wheel to generate haptic feedback, such as a vibration, to alert the driver of the contextual speed limit (e.g., FIG. 3). In the event that the contextual speed limit (e.g., FIG. 3) changes, the ECU 15 also updates the driver of the changes with the audio, visual, or haptic feedback.

Figure 2:
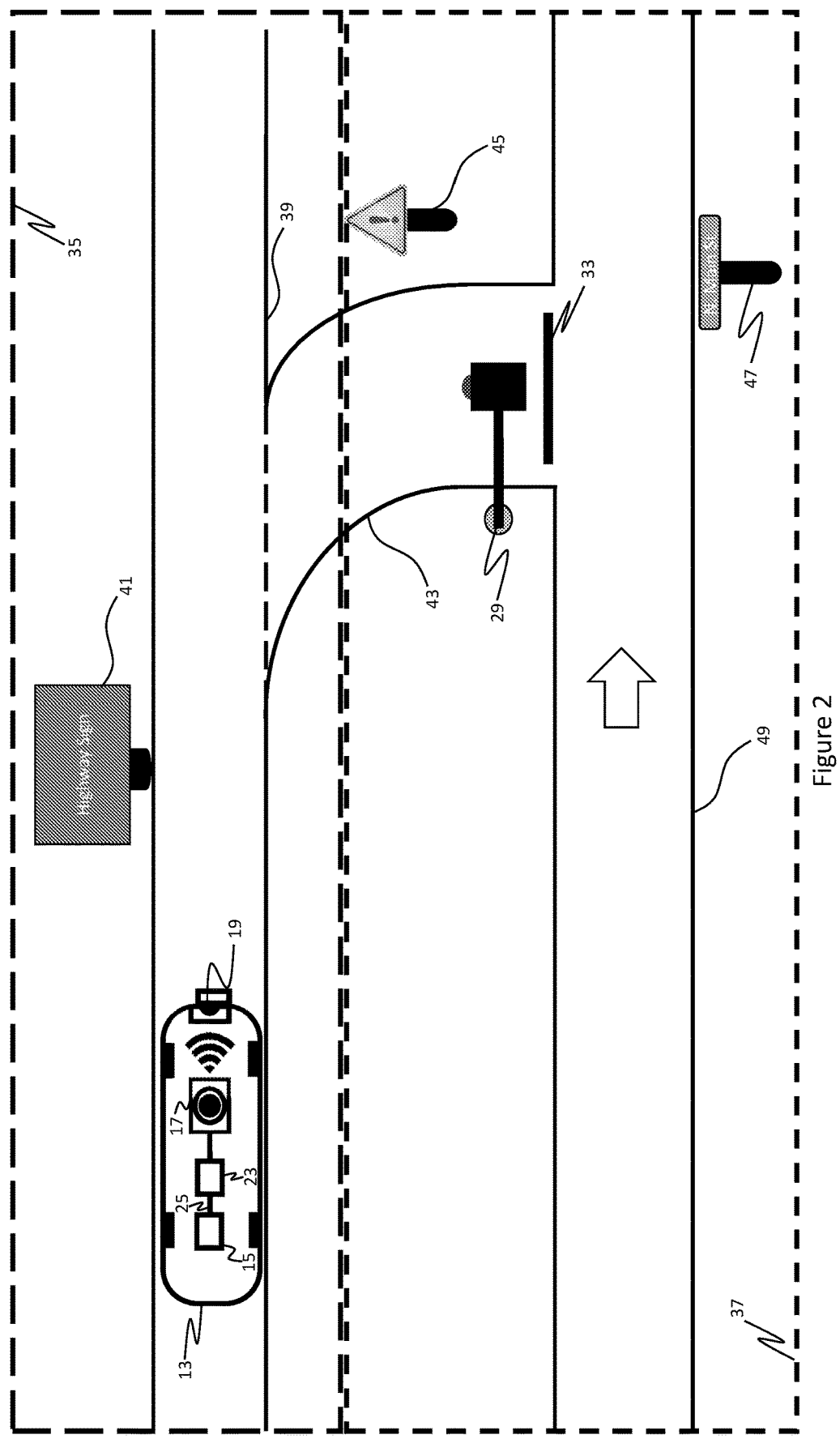
FIG. 2 shows a system in accordance with one or more embodiments disclosed herein.

Turning to FIG. 2, FIG. 2 depicts a scenario where the vehicle 13 transitions from a highway context region 35 to a city context region 37. As shown in FIG. 2, the vehicle 13 is depicted as traveling on a highway 39 that extends through the highway context region 35. The highway context region 35 also includes a highway sign 41 disposed adjacent to the highway 39, and the highway sign 41 describes guidance information such as the distance from the highway sign 41 to the next major city, the name of the highway 39, or similar information associated with the highway 39. Based upon the highway sign 41, the vehicle 13 determines that the context of the environment is a "highway" context, and determines the contextual speed limit (e.g., FIG. 3) according to the overarching speed limits associated with a highway context.

As noted above, the vehicle 13 is able to form the context determination based upon multiple objects located in the environment of the vehicle 13. However, the ECU 15 does not have foreknowledge of the boundaries of a given context region, as the context region is determined based upon real-time information. Thus, it is possible that the vehicle 13 exits the highway context region 35 and enters the city context region 37 via a highway exit 43 without being aware that the context has changed and the vehicle 13 is now located in a different context region.

To mitigate this, the ECU 15 is configured to discount the previously determined context if the ECU 15 conclusively identifies an object that does not belong in the determined context. Specifically, and continuing with FIG. 2, as the vehicle 13 traverses the highway exit 43 the first sensor 17 and the second sensor 19 detect objects such as a traffic light 29, a stop line 33, a caution sign 45, a street sign 47, and a street 49. The street sign 47 is one example of guidance information, which is directional information that indicates that the vehicle is traveling in a direction that leads to a designated location. Other examples of objects including guidance information include highway signs that designate upcoming cities or locations of interest, exit signs that designate that a highway exit leads to a particular destination, or equivalent information. On the other hand, the caution sign 45, and signs such as a school zone sign, construction signs, and signs indicating upcoming road curves are examples of objects including warning information, which informs the driver of potentially unsafe conditions. Due to the fact that the traffic light 29, the stop line 33, and the street sign 47 would not be present on a highway or interstate, the vehicle 13 determines that the context associated with the region is different than a highway context. In order to determine the context of the region without being influenced by the previous objects, the vehicle 13 initiates a new matrix (e.g., FIG. 4) or deletes information in the current matrix, such that the context is determined based upon only the objects that are located in the new context. In this way, the ECU 15 determines the context of its current environment without the influence of previously identified objects, which increases the strength of the context determination process.

FIG. 3 depicts one example of a confidence matrix 57 that is used as part of a context determination process in accordance with one or more embodiments described herein. As noted above, the ECU 15 receives the identity of objects located in the specific environment of the vehicle 13 in a confidence matrix 57. In the case depicted in FIG. 3, the objects include a series of context signs 51 that a vehicle 13 has passed while driving. Each context sign 51 is associated with a distance 53, which increases as the vehicle 13 drives further from the context sign 51. Thus, the first context sign 51 has a distance 53 of 940 meters (m) as depicted in FIG. 3, while the second context sign 51 has a distance 53 of 750 meters away from the vehicle, and so on. Each context sign 51 is also associated with a weight 55 as described above, where the weight 55 is related to the distance between the vehicle 13 including the ECU 15 and the context sign 51.

Continuing with FIG. 3, each context sign 51 is also associated with a separate column of the confidence matrix 57. Thus, as depicted in FIG. 3, the first context sign 51 is associated with the first column "SS1" of the confidence matrix 57, the second context sign 51 is associated with the second column "SS2", and so on. Each potential context associated with the specific environment of the vehicle 13 forms a separate row of the confidence matrix 57, such that each cell of the confidence matrix 57 denotes a combination of a specific context sign 51 and a specific context region. In the example shown in FIG. 3, the specific environment can be determined to be one of four categories: a "city" context, a "parking" context, a "country side" context, and a "highway" context. The confidence matrix 57 also includes a final confidence column 75, where each row is summed to form a final confidence quantity associated with a particular context region.

Within each cell of the confidence matrix 57, the ECU 15 multiplies the weight 55 associated with the context sign 51 by a confidence value 67 that reflects a confidence level of the ECU that the context information corresponds to a particular specific environment of the vehicle. For example, in the first column, which is associated with the first context sign 51, the ECU 15 concludes that the context sign 51 belongs exclusively to a highway context. Thus, the ECU 15 multiplies the first three cells of the first column by a value of 0 (representing that the first context sign 51 is not associated with that context) while the fourth cell is multiplied by a confidence value 67 of 1 (representing that the first context sign 51 must be associated with that context). This forms a weighted confidence value 69 for each cell of the confidence matrix 57, such that the values of the first column will be 0 except for the value associated with a "highway" context, which has a weighted confidence value 69 of 1*0.06 as depicted in FIG. 3. This process is repeated for each column, such that each cell of the confidence matrix 57 has a weighted confidence value 69. The rows are summed in the final confidence column 75 of the confidence matrix 57, and whichever row has the highest sum is determined to be the context of the environment. As shown in FIG. 3, the "highway" row has the highest summation of weighted confidence values 69 in the final confidence column 75. Accordingly, in the case shown in FIG. 3, the ECU 15 outputs the context of the specific environment as a "highway" context determination 59.

As noted above, the ECU 15 is also configured to store overarching speed limits associated with each potential context. Thus, once the context is determined to be a "highway" context, the ECU 15 compares a designated speed limit to the overarching speed limits, and selects a contextual speed limit 61 based upon whether the designated speed limit falls within, exceeds, or is less than the overarching speed limits associated with the determined context. The result of this comparison is output by the ECU 15 as a contextual speed limit 61 as shown in FIG. 3, which is displayed to the driver of the vehicle 13 via the dashboard 23. Alternatively, if the vehicle 13 is autonomously driven, the ECU 15 uses the contextual speed limit 61 to determine the maximum autonomous operating speed of the vehicle, and automatically controls the vehicle 13 to obey the contextual speed limit 61 by operating the braking and acceleration systems (not shown) of the vehicle 13.

Figure 4:
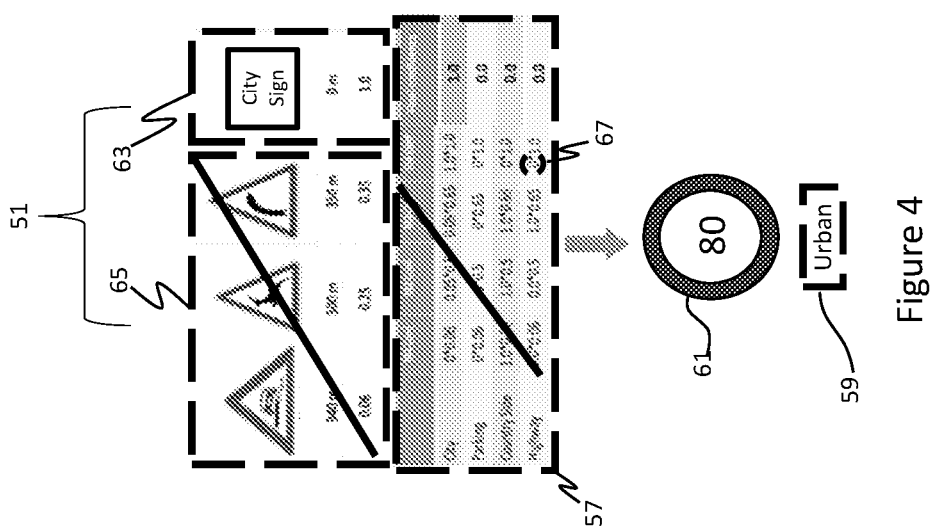
FIG. 4 shows a visualization of a process in accordance with one or more embodiments disclosed herein.

FIG. 4 depicts a confidence matrix 57 that has been modified due to the vehicle 13 encountering a context reset buffer 63. As described herein, a "context reset buffer" refers to context information that is positively correlated to a second specific environment that is different from a first specific environment correlated to the previously determined context region. As was the case for FIG. 3, the confidence matrix 57 is formed on the basis of context signs 51, which describe regulatory information, warning information, guidance information, or the presence of objects in the environment of a vehicle 13 as noted above. In the case of FIG. 4, however, the context signs 51 include previous context signs 65 that are associated with a previous context region, and a context reset buffer 63.

In the example illustrated in FIG. 4, the previous context signs 65 are signs including a first piece of warning, regulatory, or guidance information associated with a "country side" context region, which is the previous context region. On the other hand, the context reset buffer 63 is a city sign including a second piece of warning information, regulatory information, or guidance information that belongs to a "city" context. The context reset buffer 63 is associated with a weight 55 of 1.0, which is a distance based weight assignment that indicates that the ECU 15 is located in the general vicinity of the context reset buffer 63. Because the city sign logically belongs to the city context, the confidence matrix 57 reflects that the ECU 15 determines the confidence value 67 associated with the context to be 1.0 as well. The weight 55 and the confidence value 67 associated with the context reset buffer 63 are multiplied in the confidence matrix 57 with a value of 1.0*1.0, to form a weighted confidence value 69 of 1.

At this point, the ECU 15 has determined that the context reset buffer 63 indicates a "city" context, and has knowledge that the existing context is a "country side" context. Due to this apparent mismatch in context regions, the ECU 15 deletes the previous context signs 65 from the confidence matrix 57, which is illustrated by the angled line extending through the previous context signs 65 and the first three columns of the confidence matrix 57. After deleting the previous context signs 65 from the confidence matrix 57, the confidence matrix 57 is fully formed of objects that are associated with the correct/updated context. At this point, the ECU 15 determines the contextual speed limit 61 based upon the remaining weighted confidence values 69 and their associated context. Thus, by deleting irrelevant context signs 65, the ECU 15 increases the accuracy of the driving assistance system as a whole, as the ECU 15 is not biased by objects that are no longer present in the environment of the vehicle 13. For example, and as depicted in FIG. 4, because the context reset buffer 63 is associated with a "city" context, the ECU 15 outputs a maximum speed limit of 50 KPH as its contextual speed limit 61, and outputs the context to be displayed as an "urban" context determination 59. The ECU 15 transmits the contextual speed limit 61 and the context determination 59 to the dashboard 23 of the vehicle 13, which allows the contextual speed limit 61 and the context determination 59 to be displayed to a user.

The ECU 15 may also adjust the weights 55 of the confidence matrix 57 based upon the distance 53 between the vehicle 13 and the context sign 51. Specifically, as the vehicle 13 increases its distance 53 from a particular context sign 51, the likelihood that a particular context sign 51 is associated with the current context region of the vehicle 13 decreases. To account for this, the ECU 15 is configured to decrease the value of the weight 55 of the confidence matrix 57 at a predetermined rate. The predetermined rate may be determined, for example, based upon the current speed of the vehicle 13, where a high vehicle 13 speed corresponds to a fast rate of decay of the weights 55, while a slow vehicle 13 speed is associated with a relatively slow rate of decay of the weights 55. Furthermore, the algorithm used to calculate the decrease of the value of the weight 55 may be of a linear, stepwise, polynomic, sinusoidal, or equivalent form without departing from the nature of the specification.

Figure 5:
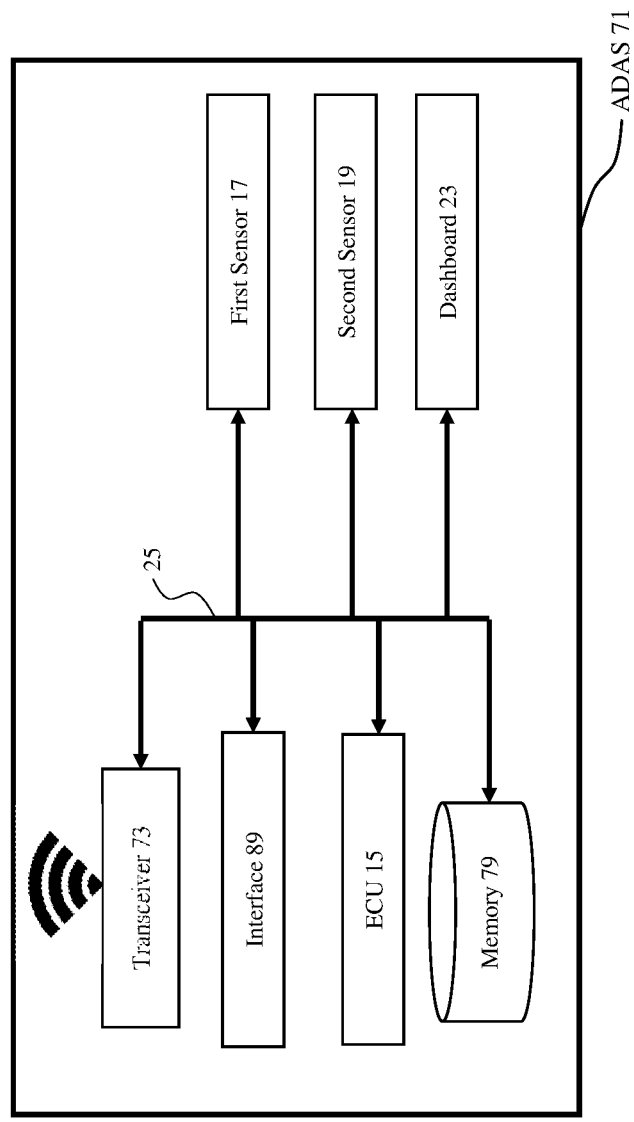
FIG. 5 shows a system in accordance with one or more embodiments disclosed herein.

FIG. 5 depicts a system overview of an Advanced Driver Assistance System (ADAS) 71 in accordance with one or more embodiments of the invention. The vehicle 13 includes a first sensor 17 and a second sensor 19, which may be an optical sensor such as a camera, radar unit, LiDAR unit, ultrasonic sensor, or other equivalent sensors known to a person of ordinary skill in the art.

As described above, the first sensor 17 and the second sensor 19 transmit captured data of the environment of the vehicle 13 to the ECU 15, which is a processor, microprocessor, or circuit that performs processing of the various data described herein. Data is transmitted to the ECU 15 by way of a bus 25, which is wires, wiring harnesses, circuit boards, or equivalent means to interconnect the various components of the vehicle 13. The ECU 15 processes the data using algorithms and processes to extract context information such as the location of the vehicle 13, context signs 51, obstacles, warning information, guidance information, and regulatory information from the captured data. The ECU 15 is further configured to derive the designated speed limit from the video feed captured by the first sensor 17 and/or the second sensor 19, or receive the designated speed limit from an external database, server, or the first sensor 17 and/or the second sensor 19, for example.

Captured data and processed data may also be transmitted to a memory 79. The memory 79 is a non-transitory storage medium such as flash memory, Random Access Memory (RAM), a Hard Disk Drive (HDD), a solid state drive (SSD), a combination thereof, or equivalent. In addition to storing the data, the memory 79 also stores processes and/or algorithms that facilitate analyzing captured data, the confidence matrix 57 and its associated values, information of the vehicle 13, processes for sending and receiving information to a user (via a dashboard 23, for example), and other functions and processes described herein. Furthermore, the memory 79 stores the confidence matrix 57 as well as its constituent values, the video feed, and other forms of data described herein.

The ADAS 71 further includes an interface 89 and a dashboard 23 in order to transmit information to a user. The dashboard 23 is a Liquid Crystal Display (LCD), Organic Light-Emitting Diode (OLED), or equivalent display, while the interface 89 is one or more buttons, dials, or a touchscreen that allows a user to interact with the vehicle 13. The dashboard 23 displays information such as a context determination 59 and a contextual speed limit 61 to a user, which allows the user to see an accurate speed limit of a roadway 11 at any period of time while driving. On the other hand, the interface 89 allows a user to select convenience features such as a unit for measuring the speed limit (such as MPH or KPH). The interface 89 may also be used to adjust the context determination process itself, such as allowing a user to manually reset the context determination 59 by pressing a button or icon, or allowing the user to manually set the context of the vehicle 13 to a desired context region, for example.

Optionally, in order to provide further usability and ease of access to a user of the driver assistance system, the ADAS 71 includes a transceiver 73, which wirelessly transmits and receives signals to and from the vehicle 13. Example embodiments of the transceiver 73 include an antenna (not shown) and processor (not shown) that transmit and receive radar, radio, cellular, satellite, Wi-Fi, Wi-Max, or other equivalent signals. The transceiver 73 may be used to transmit the location and context of the vehicle 13 to a remote server, for example, which allows the vehicle 13 to share context determination information with other vehicles. For example, a first vehicle 13 may transmit signals using its transceiver 73 to a server (not shown) that describes that the vehicle 13 is located in a "country side" context region with overarching speed limits. The server (not shown) proceeds to transmit the context to other vehicles within a specified distance of the coordinates, which allows those vehicles to have a shared context determination 59. Thus, the vehicle 13 may be operated as part of a network of vehicles that share a context determination 59, which strengthens the context determination process as a whole.

Figure 6:
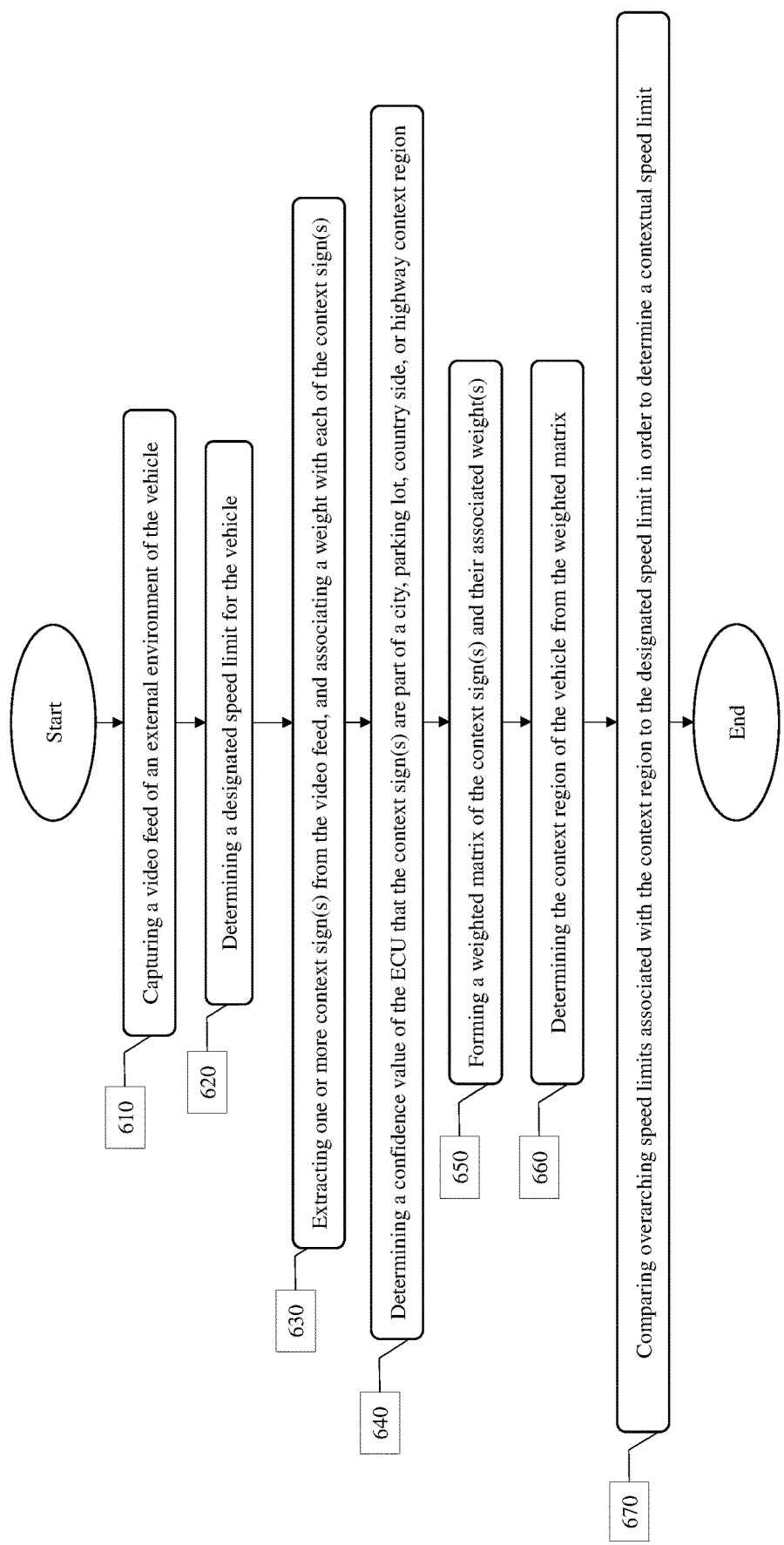
FIG. 6 shows a flowchart of a method in accordance with one or more embodiments disclosed herein.

FIG. 6 depicts a flowchart of a method for determining a contextual speed limit 61 in accordance with one or more embodiments disclosed herein. Steps of the flowchart shown in FIG. 6 may be performed by an ADAS 71 as described herein, but are not limited thereto. The constituent steps of the method depicted in FIG. 6 may be performed in any logical order, and the method is not limited to the sequence presented. Furthermore, steps of FIG. 6 may be combined and performed in a single step (or single action) without departing from the nature of the specification.

As depicted in FIG. 6, the method initiates at step 610, which includes capturing a video feed of an external environment of a vehicle 13. The video feed may be captured while the vehicle 13 is stationary or mobile, and is captured with a first sensor 17 or second sensor 19 of the vehicle 13. The video feed is a forward facing view of a road, parking lot, paved surface, dirt road, or other view in front of a vehicle 13, and includes obstacles, signs, and other landmarks in the vicinity of the vehicle 13. The video feed is transmitted from the first sensor 17 and/or the second sensor 19 using the bus 25, at which point the method proceeds to step 620.

In step 620, the vehicle 13 determines a designated speed limit at or near its current position. In particular, the designated speed limit is derived from the video feed captured in step 610 using an object detection process, for example. Examples of processing the data include inputting the data into object detection algorithms such as a Single Shot Detection (SSD), Region-based Convolutional Neural Network (R-CNN), You Only Look Once (YOLO) Single Shot Detection, Fast R-CNN, Histogram of Oriented Gradients (HOG), or equivalent algorithms. The video feed is processed in real time, or near real time, to provide the ECU 15 with instantaneous or near instantaneous feedback as to its environment. The object detection process may be performed by the ECU 15, a dedicated component such as a graphics card and/or processor, or by the first sensor 17 or the second sensor 19 themselves, using onboard processors included therein. As an output of the algorithm, the ECU 15 receives the identity of the object, the location of the object, and any text associated with the object. The text includes, by way of nonlimiting example, a speed limit denoted as a number, a unit of measurement associated with the measurement (i.e., "MPH" or "KPH"), and text indicating the identity of the sign (i.e., "Speed Limit"). Thus, step 620 includes processing the video feed through an object detection algorithm and receiving a designated speed limit for the vehicle.

In step 630, the video feed is further analyzed by the ECU 15 to extract context signs 51, which are forms of context information, from the environment of the vehicle 13. In addition, speed limit signs are detected by the first sensor 17 and/or the second sensor 19, and used to determine a designated speed limit, and the confidence values 67 and weights 55 associated therewith. In this step, the ECU 15 processes images of the video feed through the object detection algorithm to determine the identity of objects present in the environment. As noted above, nonlimiting examples of object detection algorithms include convolutional neural networks such as R-CNN, Fast R-CNN, and YOLO. Other object detection algorithms may be used in conjunction with a captured video feed without departing from the nature of this specification. Each object detected is associated with a weight 55 that is a number ranging from 0-1 that indicates distance 53 between the vehicle 13 and the object. Once the objects are extracted from the video feed and correlated with a weight 55, the method proceeds to step 640. The step of extracting context information from the video feed may be performed as part of the object detection algorithm utilized in step 620, or performed as a separate process. That is, steps 620 and 630 may be combined as part of a single object detection process, or be performed separate from each other.

In step 640, the ECU 15 correlates the extracted objects to the specific environment. Specifically, the ECU 15 stores the detected objects in a confidence matrix 57, along with the distance 53 between the vehicle 13 and the object, and the weight 55 associated with the distance 53. The ECU 15 then determines a confidence value 67 for each potential context region that the object may belong to such that a single object is associated with a series of confidence values 67 that correspond to multiple context regions, where the confidence values 67 also range from 0-1. The confidence values 67 may be derived from a table stored in a memory 79 of the vehicle 13 where the ECU 15 looks up the confidence value 67, or received from a server, based upon the identity of the object. Regardless of the method of acquiring the confidence values 67, the ECU 15 stores the confidence values 67 in the confidence matrix 57, at which point the method proceeds to step 650.

In step 650, the weights 55 and the confidence values 67 are multiplied to form a weighted confidence matrix 57. As noted above, the confidence values 67 and weights 55 are stored in the confidence matrix 57 in matrix form, where the rows correspond to different context regions and the columns correspond to different context signs. Thus, when the weights 55 are multiplied by the confidence values 67 in cells of the confidence matrix 57, the overall confidence matrix 57 may be analyzed to determine the context region that the ECU 15 believes the vehicle 13 is present in.

In step 660, the ECU 15 determines the context region that the vehicle 13 is present in based upon the confidence matrix 57. In particular, the ECU 15 sums the rows of the confidence matrix 57 into a final confidence column 75, and outputs a final context determination 59 that identifies the context region associated with the row that has the highest summed value. The ECU 15 may sum the values to determine the context of the vehicle 13 at a predetermined rate, or may determine the context of the vehicle 13 only when a new context sign 51 is added to the confidence matrix 57, for example. Other durations may be used, consistent with the examples of the invention described herein. Once the ECU 15 determines the context region of the vehicle 13 from the confidence matrix 57, the method proceeds to step 670.

In step 670, the ECU 15 compares the designated speed limit to overarching speed limits associated with the context region to determine a contextual speed limit 61 to output to the user. The overarching speed limits associated with each context region may be stored in the memory 79, for example. In addition, and as noted above, the ECU 15 receives a designated speed limit from the video feed captured by the first sensor 17 and/or second sensor 19, or an external source such as a server (not shown).

If the designated speed limit is determined to be within the overarching speed limits, the ECU 15 outputs the designated speed limit as the contextual speed limit. Furthermore, if the designated speed limit exceeds a maximum overarching speed limit, the ECU 15 outputs the maximum overarching speed limit as the contextual speed limit. Alternatively, if the ECU 15 has a relatively high confidence value 67 (e.g., above a threshold, implying that the ECU 15 is confident of its current context), and a relatively low confidence in the extracted designated speed limit (e.g., the ECU 15 is unsure about the value of the designated speed limit), then the ECU 15 may output the overarching maximum speed limit as the contextual speed limit. In addition, if the ECU 15 determines that the designated speed limit is less than an overarching minimum speed limit of the context region, the ECU 15 outputs the overarching minimum speed limit as the contextual speed limit. Finally, if the ECU 15 is unable to extract a speed limit from a sign, or the local environment is devoid of speed limit signs, the ECU 15 outputs the maximum overarching speed limit as the contextual speed limit 61. This process ensures that the designated speed limit received by the ECU 15 is not an error, and further ensures that the driver is alerted that a speed limit may be too fast or too slow for the surrounding environment.

Figure 7:
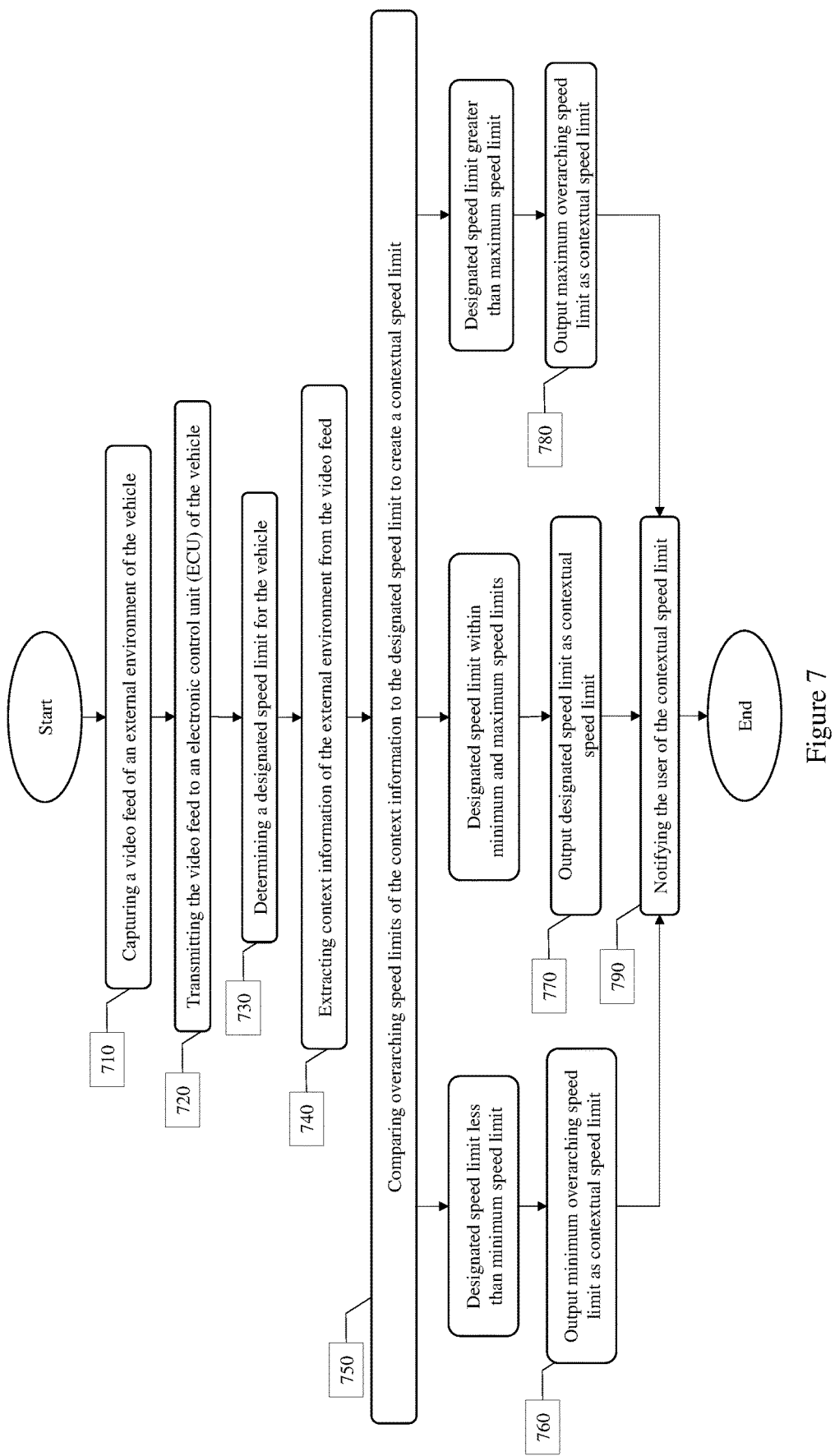
FIG. 7 shows a flowchart of a method in accordance with one or more embodiments disclosed herein.

FIG. 7 depicts a flowchart of a method for notifying a user of a contextual speed limit 61 in accordance with one or more embodiments disclosed herein. Steps of the flowchart shown in FIG. 7 may be performed by an ADAS 71 as described herein, but are not limited thereto. The constituent steps of the method depicted in FIG. 7 may be performed in any logical order, and the method is not limited to the sequence presented. Furthermore, multiple steps of FIG. 7 may be combined in a single step or action without departing from the nature of this disclosure.

In step 710, a video feed of an environment of the vehicle 13 is captured. The vehicle 13 is equipped with a first sensor 17 and/or a second sensor 19 that may be embodied, for example, as a two dimensional camera, a three dimensional camera, or a series of cameras. The first sensor 17 and the second sensor 19 capture a video feed that includes objects located in the vicinity of the vehicle 13, which allows the video feed to be analyzed to determine the specific environment of the vehicle 13 based upon the identity of the objects. The video feed may be transmitted to a memory 79 of the ECU 15 for further processing, where the ECU 15 is able to access the video feed by interfacing with the memory 79, or transmitted directly to the ECU 15, for example.

In step 720, the video feed is transmitted to an ECU 15 of the vehicle 13. Structurally, the first sensor 17 and the second sensor 19 are connected to the ECU 15 via a bus 25, which is a series of wires or similar data transmission means. The ECU 15 may send signals requesting the video feed and/or designated speed limit (if not derived by the ECU 15) to each of the first sensor 17 and/or the second sensor 19. Alternatively, the first sensor 17 and the second sensor 19 may transmit the data at routine intervals according to the speed of the vehicle 13, a predetermined transmission rate, or at a user's request without departing from the nature of this specification. Regardless of the method for requesting the data, or the type of data requested, step 720 concludes with the ECU 15 having received the video feed of step 710.

In step 730, the vehicle 13 determines a designated speed limit related to its current position. As discussed above, the designated speed limit is derived from the video feed captured in step 710 using an object detection process, for example. Such an object detection process may be performed by the ECU 15, a dedicated component such as a graphics card, or by the first sensor 17 or the second sensor 19 themselves. As an output of the object detection process, the ECU 15 receives the identity of the object, the location of the object, and any text associated with the object, which forms the designated speed limit. Alternatively, if the designated speed limit is retrieved from an external source, such as a server, the regulatory information is received via a transceiver 73.

In step 740, the ECU 15 extracts context information to determine a context region associated with the external environment of the vehicle. As discussed above, the ECU 15 performs an object detection process to determine the identity of the object, which is used to generate a context associated with the vehicle 13. This information is stored in a confidence matrix 57 in the form of context signs 51, distances 53 associated with the context signs 51, and weights 55 associated with the context signs 51. The ECU 15 proceeds to determine confidence values 67 associated with each potential context region that an object may be associated with. The confidence values 67 and weights 55 are multiplied in the confidence matrix 57 to form a weighted confidence matrix 57. Once the weighted confidence matrix 57 is formed, the ECU 15 sums the values of the rows of the confidence matrix 57 in a final confidence column 75, and determines the context region to be the region associated with the row with the highest summation.

In step 750, the ECU 15 determines a contextual speed limit 61 based upon the determined context region. In this step, the designated speed limit determined, extracted, or received by the ECU 15 in step 730 is compared to speed limits associated with the context region. As noted above, each context region is associated with overarching minimum and maximum speed limits, which may be determined by a government entity, for example. During the comparison process, the ECU 15 determines whether the designated speed limit is less than, greater than, or within the overarching minimum and maximum speed limits associated with the context region. The output of the comparison process is discussed further in relation to steps 760-780.

If the ECU 15 determines that the designated speed limit is less than a minimum overarching speed limit of the context region, the ECU 15 outputs the minimum overarching speed limit as the contextual speed limit in step 760. Such a situation may occur, for example, in a construction zone on a highway, where the designated speed limit of the construction zone is lower than the minimum safe speed limit of the highway. This process ensures that the designated speed limit received by the ECU 15 is not an error, and further ensures that the driver is aware that a speed limit may be too fast or too slow for the surrounding environment.

Alternatively, if the designated speed limit is determined to be within the overarching speed limits, the ECU 15 will output a contextual speed limit 61 that matches the designated speed limit in step 770. In this case, the designated speed limit is validated through the comparison process such that the ECU 15 is aware that the designated speed limit is not too fast or slow for the current context region. Alternatively, if the ECU 15 has a high confidence value 67 related to the context of the vehicle and a relatively low confidence in the extracted designated speed limit, then the ECU 15 may output the overarching maximum speed limit as the contextual speed limit. Because the contextual speed limit 61 is output to the dashboard 23, and remains displayed until another contextual speed limit 61 is displayed, the user may be reminded of a safe speed limit throughout the entire period for operating the vehicle 13, regardless of whether additional speed limit signs are present for the user to see. Thus, the user is also aware of a contextual speed limit 61 that is a validated version of the designated speed limit.

Finally, if the designated speed limit exceeds a maximum overarching speed limit. the ECU 15 outputs the maximum overarching speed limit as the contextual speed limit 61 in step 780. This step ensures that the user of the ADAS 71 is only aware of speeds that are safe to travel through its current environment. Such is beneficial for discarding false and inaccurate information that communicates the designated speed limit. For example, if a vehicle 13 is traveling through an "urban" context region with a maximum speed limit of 50 KPH, and the ECU 15 receives information that the designated speed limit is 70 KPH, the vehicle 13 will output a contextual speed limit 61 of 50 KPH. This ensures that the user will only be aware of speed limits that are safe for the current environment, and will not attempt to follow a false speed limit received by the ECU 15.

In step 790, the contextual speed limit 61 is output to a user via a dashboard 23. The dashboard 23 is located in a cabin of the vehicle 13, and presents visual information related to the operation of the vehicle 13 to the user. Thus, the contextual speed limit 61 is displayed to a user in the cabin of the vehicle 13 alongside the operating information. The contextual speed limit 61 may be output as an icon that is identical to a speed limit sign, or alternatively output as a number with text indicating that the number is the contextual speed limit 61. The contextual speed limit 61 may further include an icon that designates that the contextual speed limit 61 is identical to a designated speed limit, or an icon to indicate that the ECU 15 has entered the degraded mode if a video feed is unavailable, for example. Thus, the method completes with the user being apprised of the contextual speed limit 61. Alternatively, in a case where the vehicle 13 is an autonomous vehicle, the method may include an additional step of controlling the vehicle 13 (with the ECU 15, for example) to obey the contextual speed limit 61. Following step 790, the method may restart at step 710 to determine the current context region of the vehicle, or to add additional context signs 51 to the confidence matrix 57.

Accordingly, embodiments disclosed herein relate to devices and methods useful for determining a contextual speed limit derived based upon the surrounding environment of a vehicle. Specifically, embodiments disclosed herein evaluate objects present in the surrounding environment to determine a context region that describes the environment. Based upon the determined context region and a designated speed limit, an Electronic Control Unit (ECU) outputs a contextual speed limit. In contrast to merely detecting a designated speed limit, a vehicle equipped with an Advanced Driver Assistance System (ADAS) as described herein is capable of filtering out false or otherwise invalid designated speed limits. This advantageously increases the safety of the user by ensuring that the vehicle only ever displays speed limits that are within acceptable limits for the current environment.

Although only a few example embodiments have been described in detail above, those skilled in the art will readily appreciate that many modifications are possible in the example embodiments without materially departing from this invention. For example, the ECU may receive a context region from an external or internal server or database. In this case, the ECU compares the designated speed limit to overarching speed limits associated with the received context region without the need for a confidence matrix or confidence values, which increases the efficiency of the system. Alternatively, the ECU may receive the designated speed limit from a Global Positioning System (GPS) or an external server, or the vehicle may be connected to a network of vehicles. Accordingly, all such modifications are intended to be included within the scope of this disclosure as defined in the following claims.

What is claimed is:

1. A method for operating a driver assistance system for a vehicle, comprising:
   capturing a video feed of an external environment of the vehicle using a camera;
   transmitting the video feed to an Electronic Control Unit (ECU) of the vehicle;
   determining a designated speed limit for the vehicle at a current location of the vehicle;
   extracting context information of the external environment from the video feed;
   comparing the context information to the designated speed limit to create a contextual speed limit;
   notifying a user of the vehicle of the contextual speed limit using a dashboard comprising a display, and
   automatically controlling a speed of the vehicle according to the contextual speed limit,
   wherein the context information designates a specific environment that the vehicle is located in based upon one or more of: first warning information that informs the user of unsafe driving conditions, first guidance information that provides directional information to the user, and objects located in the specific environment;
   wherein the context information comprises a weighted confidence value that is determined by multiplying a confidence value with a weight;
   wherein the confidence value reflects a confidence level of the ECU that the context information corresponds to a particular specific environment of the vehicle;
   wherein the weight corresponds to a distance between the vehicle and an object located in the specific environment of the vehicle, and
   wherein the ECU is further configured to decrease the weight at a predetermined rate that is determined based upon a current speed of the vehicle.

2. The method of claim 1, wherein the specific environment is determined to be a city, a parking lot, a country side, a highway, a school zone, a highway exit zone, a construction area, or equivalent.

3. The method of claim 2, wherein each location that is designated as the specific environment is associated with a different maximum speed limit of the vehicle.

4. The method of claim 1, wherein the first warning information indicates that a driving hazard is located in the specific environment of the vehicle.

5. The method of claim 1, wherein the first guidance information indicates that the vehicle is traveling in a direction that leads to a designated location.

6. The method of claim 1, wherein the context information is further based upon first regulatory information of the external environment, and wherein the first regulatory information includes at least one of a stop sign, a traffic light, a speed limit sign, a yield sign, or equivalent.

7. The method of claim 1, further comprising: determining that the vehicle has entered a new environment when a context reset buffer is detected, the new environment including a city, a parking lot, a country side, a highway, a school zone, a highway exit zone, a construction area, or equivalent environment that is different from the specific environment.

8. The method of claim 7, wherein the context reset buffer comprises at least one of:
   second warning information, second guidance information, and second regulatory information that is associated with the new environment.

9. A driver assistance system for a vehicle, comprising:
   a camera configured to capture a video feed of an external environment of the vehicle;
   a dashboard comprising a display configured to notify a user of the vehicle of one or more vehicle operating conditions, and
   an Electronic Control Unit (ECU) configured to:
   receive the video feed from the camera;
   determine a designated speed limit for the vehicle at a current location of the vehicle;
   extract context information of the external environment from the video feed;
   compare the context information to the designated speed limit to create a contextual speed limit, and
   output the contextual speed limit to the dashboard to notify the user of the contextual speed limit,
   wherein the context information designates a specific environment that the vehicle is located in based upon one or more of: first warning information that informs the user of unsafe driving conditions, first guidance information that provides directional information to the user, and objects located in the specific environment of the vehicle, and wherein the context information comprises a weighted confidence value that is determined by multiplying a confidence value with a weight;

wherein the confidence value reflects a confidence level of the ECU that the context information corresponds to a particular specific environment of the vehicle;

wherein the weight corresponds to a distance between the vehicle and an object located in the specific environment of the vehicle, and wherein the ECU is further configured to automatically control a speed of the vehicle according to the contextual speed limit.

10. The driver assistance system of claim 9, wherein the specific environment is determined to be a city, a parking lot, a country side, or a highway.

11. The driver assistance system of claim 10, wherein each location that is designated as the specific environment is associated with a different maximum speed limit of the vehicle.

12. The driver assistance system of claim 9, wherein the first warning information indicates that a driving hazard is located in the specific environment of the vehicle.

13. The driver assistance system of claim 9, wherein the first guidance information indicates that the vehicle is traveling in a direction that leads to a designated location.

14. The driver assistance system of claim 9, wherein the context information is further based upon first regulatory information of the external environment, and wherein the first regulatory information includes at least one of a stop sign, a traffic light, a speed limit sign, a yield sign, or equivalent.

15. The driver assistance system of claim 9, wherein the ECU is configured to determine that the vehicle has entered a new environment when the ECU detects a context reset buffer, the new environment including a city, a parking lot, a country side, a highway, a school zone, a highway exit zone, a construction area, or equivalent zone that is different from the specific environment.

16. The driver assistance system of claim 15, wherein the context reset buffer comprises at least one of: second warning information, second guidance information, and second regulatory information that is associated with the new environment.

* * * * *